United States Patent
Kumar et al.

(10) Patent No.: US 12,487,351 B2
(45) Date of Patent: Dec. 2, 2025

(54) METHOD AND SYSTEMS FOR PHASELESS FREQUENCY-MODULATED CONTINUOUS-WAVE MULTISTATIC RADAR IMAGING

(71) Applicant: Tata Consultancy Services Limited, Mumbai (IN)

(72) Inventors: Achanna Anil Kumar, Bangalore (IN); Krishna Kanth Rokkam, Bangalore (IN); Aditi Kuchibhotla, Bangalore (IN); Kriti Kumar, Bangalore (IN); Tapas Chakravarty, Kolkata (IN); Arpan Pal, Kolkata (IN); Angshul Majumdar, New Delhi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 316 days.

(21) Appl. No.: 18/457,984

(22) Filed: Aug. 29, 2023

(65) Prior Publication Data
US 2024/0151846 A1 May 9, 2024

(30) Foreign Application Priority Data
Oct. 28, 2022 (IN) .............................. 202221061623

(51) Int. Cl.
*G01S 13/89* (2006.01)
*G01S 7/41* (2006.01)

(52) U.S. Cl.
CPC ................ *G01S 13/89* (2013.01); *G01S 7/41* (2013.01)

(58) Field of Classification Search
CPC . G01S 13/89; G01S 7/41; G01S 13/34; G01S 13/003
See application file for complete search history.

(56) References Cited

U.S. PATENT DOCUMENTS
2022/0260697 A1* 8/2022 Saitto .................... G01S 13/003

FOREIGN PATENT DOCUMENTS
CN 112946589 A 6/2021

OTHER PUBLICATIONS
M. Ritchie, M. Inggs, H. Griffiths, F. Fioranelli, M. Ritchie, and K. Woodbridge, âMulti static radar: System requirements and experimental validation,â Oct. 2014. (Year: 2014).*
(Continued)

*Primary Examiner* — Vladimir Magloire
*Assistant Examiner* — Naomi M Wolford
(74) *Attorney, Agent, or Firm* — Finnegan, Henderson, Farabow, Garrett & Dunner, LLP

(57) ABSTRACT

Existing multistatic configurations of Radar systems requires a direct LoS signal and/or time synchronization among the Radar transmitter and the multistatic distributed Radar receivers. The present disclosure provides a phaseless frequency-modulated continuous-wave multistatic Radar (PFMR) imaging that relaxes requirement of the direct LoS signal and only requires a plurality of parameters of a FMCW signal comprising a chirp signal rate, a carrier frequency and, a period of chirp to be known. Further, it also removes condition of the time synchronization among a plurality of FMCW multistatic distributed Radar receivers. However, because of absence of the time synchronization among a plurality of FMCW multistatic distributed Radar receivers, an unknown random phase offset appears after deramping. The present disclosure eliminates the unknown random phase offset, by performing autocorrelation function on a mixed signal, resulting in a phaseless measurement data corresponding to a plurality of FMCW Radar imaging signals.

18 Claims, 8 Drawing Sheets

(56) References Cited

OTHER PUBLICATIONS

P. Samczynski, M. Wilkowski, and K. Kulpa, âTrial results on bistatic passive radar using non-cooperative pulse radar as illuminator of oppor-tunity,â International Journal of Electronics and Telecommunications, vol. 58, Jun. 2012. (Year: 2012).*

J. Liu, H. Li, and B. Himed, âTwo target detection algorithms for passive multistatic radar,â IEEE Transactions on Signal Processing , vol. 62, No. 22, pp. 5930â5939, 2014. (Year: 2014).*

M. Ash, M. Ritchie, K. Chetty, and P. V. Brennan, âA new multistatic fmcw radar architecture by over-the-air deramping,â IEEE Sensors Journal, vol. 15, No. 12, pp. 7045â7053, 2015. (Year: 2015).*

A. Asif and S. Kandeepan, âCooperative fusion based passive multistatic radar detection,â Sensors, vol. 21, No. 9, 2021. [Online]. Available: https://www.mdpi.com/1424â8220/21/9/3209. (Year: 2021).*

A. Akhtar, B. Yonel, and B. Yazici, âPassive multistatic radar imaging with prior information,â in 2021 IEEE Radar Conference (Radar-Conf21), 2021, pp. 1â6. (Year: 2021).*

I.-Y. Son, B. Yonel, and B. Yazici, âMulti static passive radar imaging using generalized wirtinger flow,â in 2019 20th International Radar Symposium (IRS), 2019, p. 1â7. (Year: 2019).*

B. Yonel, E. Mason, and B. Yazici, âPhaseless passive synthetic aperture radar imaging via wirtinger flow,â in 2018 52nd Asilomar Conference on Signals, Systems, and Computers. IEEE, 2018, pp. 1623â1627. (Year: 2018).*

E. J. Candes, X. Li, and M. Soltanolkotabi, âPhase retrieval via wirtinger flow: Theory and algorithms,â IEEE Transactions on Information The-ory, vol. 61, No. 4, pp. 1985â2007, 2015. (Year: 2015).*

M. V. Afonso, J. M. Bioucas-Dias, and M. A. Figueiredo, âAn aug-mented lagrangian approach to the constrained optimization formulation of imaging inverse problems,â IEEE Transactions on Image Processing, vol. 20. No. 3. pp. 681â695. 2010. (Year: 2010).*

C. Li, W. Yin, H. Jiang, and Y. Zhang, âAn efficient augmented lagrangian method with applications to total variation minimization,â Computational Optimization and Applications, vol. 56, No. 3, pp. 507â530. 2013. (Year: 2013).*

S. H. Chan, X. Wang, and O. A. Elgendy, âPlug-and-play admm for image restoration: Fixed-point convergence and applications,â IEEE Transactions on Computational Imaging, vol. 3, No. 1, pp. 84â98, 2016. (Year: 2016).*

K. Aditi et al., "Phaseless FMCW Multistatic Radar," 2022 IEEE Sensors, Dallas, TX, USA, 2022, pp. 1-4, doi: 10.1109/SENSORS52175. 2022.9967123. (Year: 2022).*

Durr, Andre et al., "Leakage Phase Noise Mitigation for Monostatic FMCW Radar Sensors Using Carrier Transmission", Title of the item: Microwave Engineering, Date: 2019, Publisher: IEEE, Link: https://d-nb.info/1212453948/34.

* cited by examiner

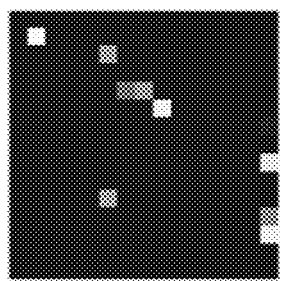 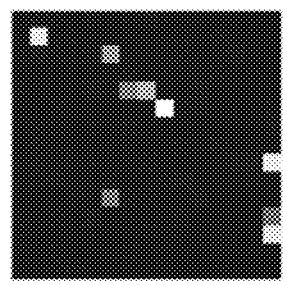 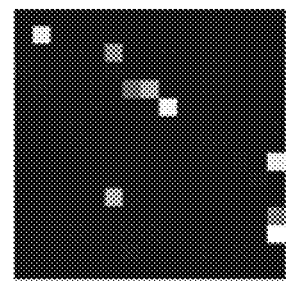
FIG. 5A         FIG. 5B         FIG. 5C
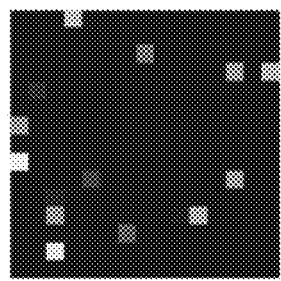 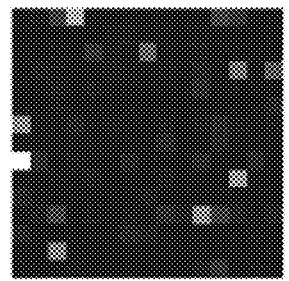 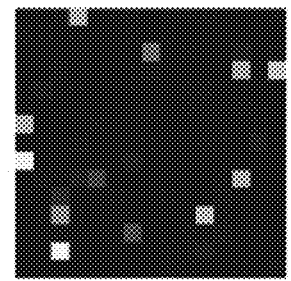
FIG. 6A         FIG. 6B         FIG. 6C

METHOD AND SYSTEMS FOR PHASELESS FREQUENCY-MODULATED CONTINUOUS-WAVE MULTISTATIC RADAR IMAGING

PRIORITY CLAIM

This U.S. patent application claims priority under 35 U.S.C. § 119 to: Indian Provisional Patent Application No. 202221061623, filed on Oct. 28, 2022. The entire contents of the aforementioned application are incorporated herein by reference.

TECHNICAL FIELD

The disclosure herein generally relates to Radio Detection And Ranging (Radar) imaging, and, more particularly, to method and system for phaseless frequency-modulated continuous-wave multistatic Radar (PFMR) imaging.

BACKGROUND

Radio Detection And Ranging (Radar) is an all-weather friendly detection and imaging system, which has different modes of operation namely monostatic, bistatic and multi-static configuration modes. The multistatic configuration of the Radar allows target view from different angles and hence providing enhanced Radar imaging. A classical multistatic Radar system requires a direct LoS (line-of-sight) signal and/or time synchronization among multistatic distributed Radar receivers. Hence the classical multistatic Radar is only suitable if the Radar transmitter is fully cooperative and the direct LoS signal is available. Further a passive multistatic Radar system uses signals of opportunity for the Radar imaging based on phase retrieval techniques. However, the passive multistatic Radar system requires the multistatic distributed Radar receivers to be synchronized. Hence, the existing multistatic configurations of Radar systems requires the direct LoS signal and/or the time synchronization among the Radar transmitter and the multistatic distributed Radar receivers, hence increasing overall cost of the system.

SUMMARY

Embodiments of the present disclosure present technological improvements as solutions to one or more of the above-mentioned technical problems recognized by the inventors in conventional systems. For example, in one embodiment, a method for phaseless frequency-modulated continuous-wave multistatic Radar (PFMR) imaging is provided. The method includes transmitting via a frequency-modulated continuous-wave (FMCW) non-cooperative transmitter a plurality of chirp signals over a scene of interest. Further the method includes receiving via a plurality of FMCW multistatic distributed Radio Detection And Ranging (Radar) receivers, a plurality of FMCW Radar imaging signals back scattered from the scene of interest. The method includes generating a reference chirp signal at each of the plurality of FMCW multistatic distributed Radar receivers, with an unknown random phase offset between a location of the non-cooperative FMCW transmitter and position of corresponding FMCW Radar receiver. The method further includes mixing, the plurality of FMCW Radar imaging signals at each of the plurality of FMCW multistatic distributed Radar receivers with the corresponding generated reference chirp signal, to obtain a mixed signal with unknown random phase offset. The method further includes performing an auto-correlation function, on to the mixed signal for eliminating the unknown random phase offset, resulting in a phaseless measurement data corresponding to the plurality of FMCW Radar imaging signals. The method then includes discretizing, the scene of interest, into a plurality of small cells, and generate a forward model(L) corresponding to the location of the plurality of FMCW multistatic distributed Radar receivers, the non-cooperative FMCW transmitter and, a plurality of discretized locations of the scene of interest. Further the method includes expressing the phaseless measurement data, by concatenating the phaseless measurement data in terms of the forward model and a plurality of reflectivities to be estimated. The method includes formulating an optimization problem and converting it to a constrained optimization problem using by using a variable splitting approach, to estimate the plurality of reflectivities from the phaseless measurement data. Further the method includes obtaining the plurality of reflectivities ($\rho$), by solving a first subproblem and a second subproblem of the constrained optimization problem. Furthermore, the method includes obtaining a plurality of reconstructed phaseless frequency-modulated continuous-wave multistatic Radar (PFMR) image signals from the obtained plurality of reflectivities.

In another aspect, a system for for phaseless frequency-modulated continuous-wave multistatic Radar (PFMR) imaging is provided. The system includes: a memory storing instructions; one or more communication interfaces; and one or more hardware processors coupled to the memory via the one or more communication interfaces, wherein the one or more hardware processors are configured by the instructions to: transmit, via a frequency-modulated continuous-wave (FMCW) non-cooperative transmitter, a plurality of chirp signals, over a scene of interest. The one or more hardware processors are configured to receive via a plurality of FMCW multistatic distributed Radio Detection And Ranging (Radar) receivers, a plurality of FMCW Radar imaging signals back scattered from the scene of interest. Further the one or more hardware processors are configured to generate a reference chirp signal at each of the plurality of FMCW multistatic distributed Radar receivers, with an unknown random phase offset between a location of the non-cooperative FMCW transmitter and position of corresponding FMCW Radar receiver. Further the one or more hardware processors are configured to mix the plurality of FMCW Radar imaging signals at each of the plurality of FMCW multistatic distributed Radar receivers with the corresponding generated reference chirp signal, to obtain a mixed signal with unknown random phase offset. Further the one or more hardware processors are configured to perform an auto-correlation function, on to the mixed signal for eliminating the unknown random phase offset, resulting in a phaseless measurement data corresponding to the plurality of FMCW Radar imaging signals. The one or more hardware processors are configured to discretize the scene of interest, into a plurality of small cells, and generate a forward model(L) corresponding to the location of the plurality of FMCW multistatic distributed Radar receivers, the non-cooperative FMCW transmitter and, a plurality of discretized locations of the scene of interest. Further the one or more hardware processors are configured to express the phaseless measurement data, in terms of the forward model and a plurality of reflectivities to be estimated, by concatenating the phaseless measurement data. The one or more hardware processors are configured to formulate an optimization problem and converting it to a constrained optimization problem by using a variable splitting approach, to estimate the plurality of reflectivities from the phaseless measurement data. The one or more hardware processors are configured to obtain the plurality of reflectivities (ρ), by solving a first subproblem and a second subproblem of the constrained optimization problem. Furthermore, the one or more hardware processors are configured to obtain a plurality of reconstructed phaseless frequency-modulated continuous-wave multistatic Radar (PFMR) image signals from the obtained plurality of reflectivities.

In yet another aspect, there are provided one or more non-transitory machine-readable information storage mediums comprising one or more instructions which when executed by one or more hardware processors cause a method for phaseless frequency-modulated continuous-wave multistatic Radar (PFMR) imaging is provided. The method includes transmitting via a frequency-modulated continuous-wave (FMCW) non-cooperative transmitter a plurality of chirp signals over a scene of interest. Further the method includes receiving via a plurality of FMCW multistatic distributed Radio Detection And Ranging (Radar) receivers, a plurality of FMCW Radar imaging signals back scattered from the scene of interest. The method includes generating a reference chirp signal at each of the plurality of FMCW multistatic distributed Radar receivers, with an unknown random phase offset between a location of the non-cooperative FMCW transmitter and position of corresponding FMCW Radar receiver. The method further includes mixing, the plurality of FMCW Radar imaging signals at each of the plurality of FMCW multistatic distributed Radar receivers with the corresponding generated reference chirp signal, to obtain a mixed signal with unknown random phase offset. The method further includes performing an auto-correlation function, on to the mixed signal for eliminating the unknown random phase offset, resulting in a phaseless measurement data corresponding to the plurality of FMCW Radar imaging signals. The method then includes discretizing, the scene of interest, into a plurality of small cells, and generate a forward model(L) corresponding to the location of the plurality of FMCW multistatic distributed Radar receivers, the non-cooperative FMCW transmitter and, a plurality of discretized locations of the scene of interest. Further the method includes expressing the phaseless measurement data, by concatenating the phaseless measurement data in terms of the forward model and a plurality of reflectivities to be estimated. The method includes formulating an optimization problem and converting it to a constrained optimization problem using by using a variable splitting approach, to estimate the plurality of reflectivities from the phaseless measurement data. Further the method includes obtaining the plurality of reflectivities (ρ), by solving a first subproblem and a second subproblem of the constrained optimization problem. Furthermore, the method includes obtaining a plurality of reconstructed phaseless frequency-modulated continuous-wave multistatic Radar (PFMR) image signals from the obtained plurality of reflectivities.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 5A, 5B, and 5C depicts performance of the PFMR imaging for 10 targets and 5 FMCW multistatic distributed Radar receivers, in accordance with some embodiments of the present disclosure.

FIGS. 6A, 6B, and 6C depicts the performance of the PFMR imaging for 15 targets and 5 FMCW multistatic distributed Radar receivers, in accordance with some embodiments of the present disclosure.

DETAILED DESCRIPTION

Figure 1:
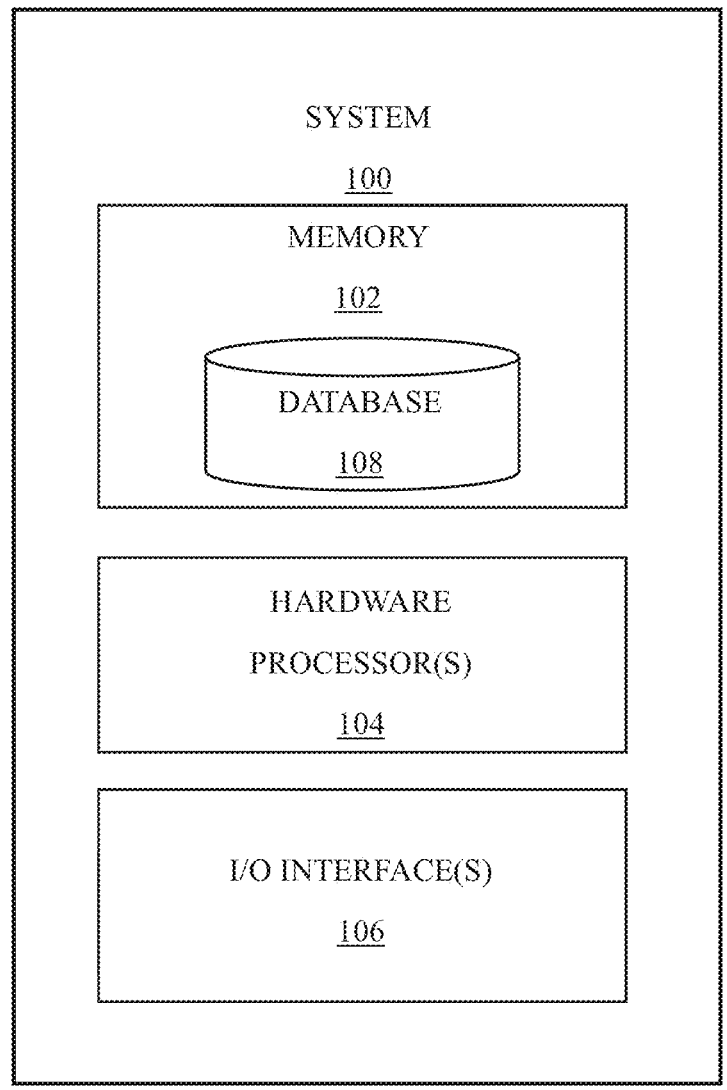
FIG. 1 illustrates an exemplary system for a phaseless frequency-modulated continuous-wave Radar multistatic Radar (PFMR) imaging, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

A classical multistatic Radar of a multistatic configuration works on a principle of cross-correlation and hence it usually requires a direct Line of sight (LoS) signal to be transmitted and/or time synchronization among a plurality of multistatic distributed Radar receivers. For this purpose, the classical multistatic Radar usually have a reference channel to receive a direct LoS signal and a surveillance channel to receive echo signals. However, use of the reference channel and the surveillance channel together, causes interference between them and increases complexity due to sampling of data in these two channels. Literature addresses these issues by using separate frequency bands for these two channels and proposes a method referred to as over-the-air deramping. However, this method is suitable if a multistatic Radar transmitter is fully co-operative and the direct LoS signal is available. Alternatively, if the plurality of multistatic distributed Radar receivers are synchronized, the detection can be achieved in literature by the principle of cross-correlation among the plurality of multistatic distributed Radar receivers. One work in literature proposed a passive multistatic Radar system which uses a plurality of signals of opportunity for detection and imaging based on phase retrieval techniques. Though these methods are robust, but they require the plurality of multistatic distributed Radar receivers to be spatially distributed for the time synchronization.

Frequency-modulated continuous-wave (FMCW) Radars are increasingly being used in the multistatic configuration referred to as a multistatic FMCW Radars, for low to mid ranging applications due to their power efficiency and better pulse compression. Embodiments herein provide a method and system for a phaseless frequency-modulated continuous-wave multistatic Radar (PFMR) imaging. The PFMR imaging relaxes the requirement of the direct LoS signal and only requires a plurality of parameters of a FMCW signal such as a chirp signal rate, a carrier frequency and, a period of chirp to be known. Further, it also removes condition of the time synchronization among a plurality of FMCW multistatic distributed Radar receivers and hence it overcomes the stringent requirement of the classical multistatic Radar, which requires the direct LoS signal transmitted and/or the time synchronization among the plurality of multistatic distributed Radar receivers. However, because of absence of the time synchronization among the plurality of multistatic distributed Radar receivers, an unknown random phase offset appears after deramping. The method and system for the PFMR imaging disclosed herein eliminates the unknown random phase offset, by performing autocorrelation function on a mixed signal, resulting in a phaseless measurement data corresponding to a plurality of FMCW Radar imaging signals.

Referring now to the drawings, and more particularly to FIGS. 1 to 7, where similar reference characters denote corresponding features consistently throughout the figures, there are shown preferred embodiments and these embodiments are described in the context of the following exemplary system and/or method.

FIG. 1 illustrates an exemplary system 100 for the PFMR imaging, in accordance with some embodiments of the present disclosure. In an embodiment, the system 100 may also be referred to as PFMR system. In an embodiment, the system 100 includes one or more processors 104, communication interface device(s) 106 or Input/Output (I/O) interface(s) 106 or user interface 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information on a plurality of chirp signals, the plurality of FMCW Radar imaging signals, a reference chirp signal and thereof. The memory 102 further includes a plurality of modules (not shown), such modules for various technique(s) such as autocorrelation function, discretization of a scene of interest, variable splitting approach, Augmented Lagrangian, regularization, Wirtinger Flow, l1-norm prior and, Alternating Direction Multipliers Method (ADMM). The above-mentioned technique(s) are implemented as at least one of a logically self-contained part of a software program, a self-contained hardware component, and/or, a self-contained hardware component with a logically self-contained part of a software program embedded into each of the hardware component (e.g., hardware processor 104 or memory 102) that when executed perform the method described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2A:
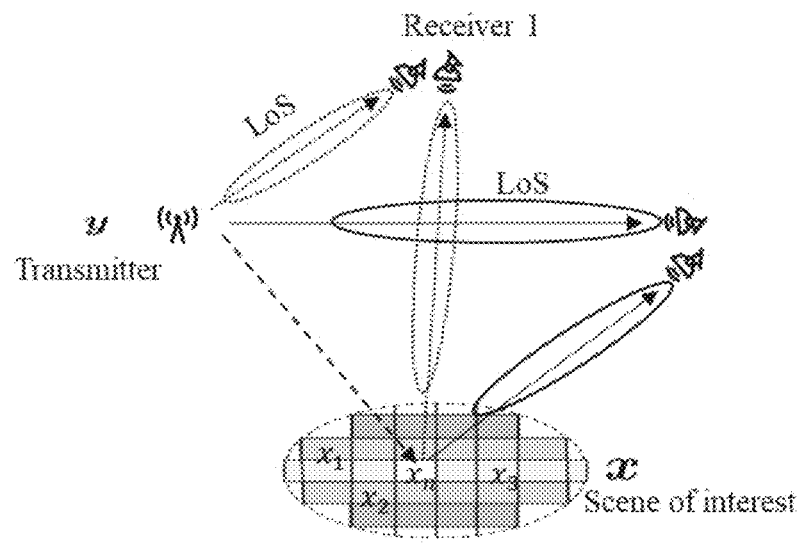
FIGS. 2A and 2B depict architecture diagrams of a classical multistatic Radar imaging, a passive multistatic Radar imaging.
Figure 2B:
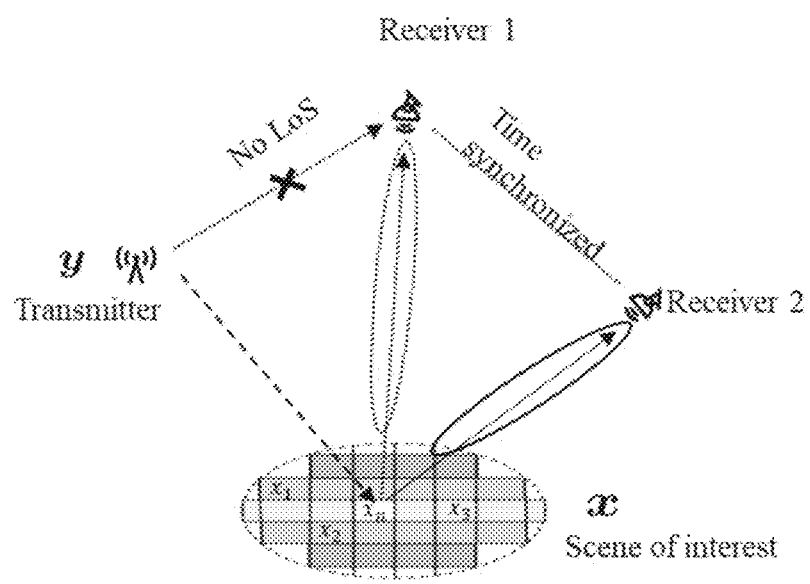
Figure 2C:
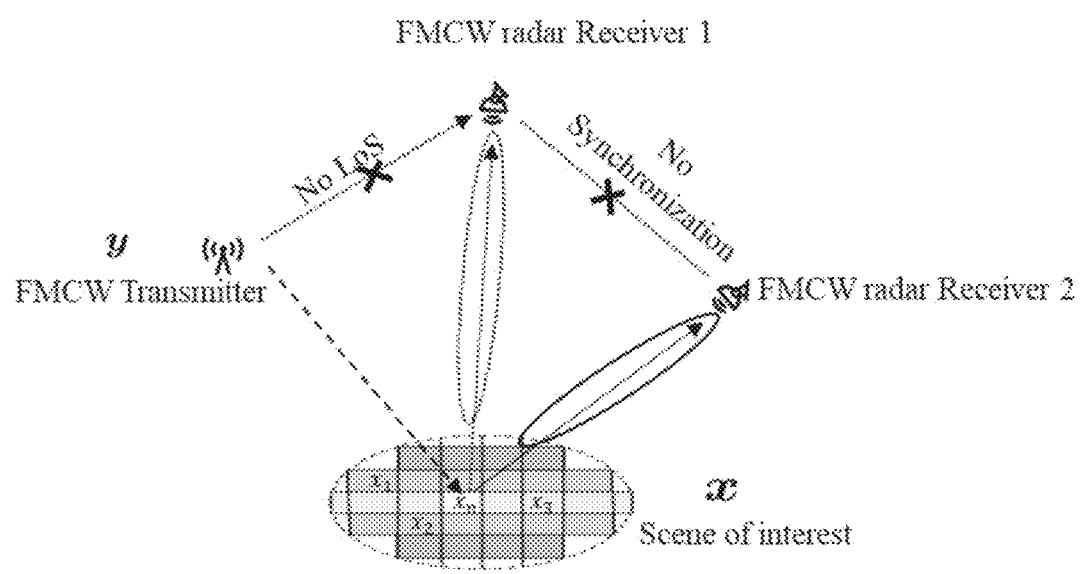
FIG. 2C depicts the PFMR imaging implemented by the system of FIG. 1, according to some embodiments of the present disclosure.
Figure 3A:
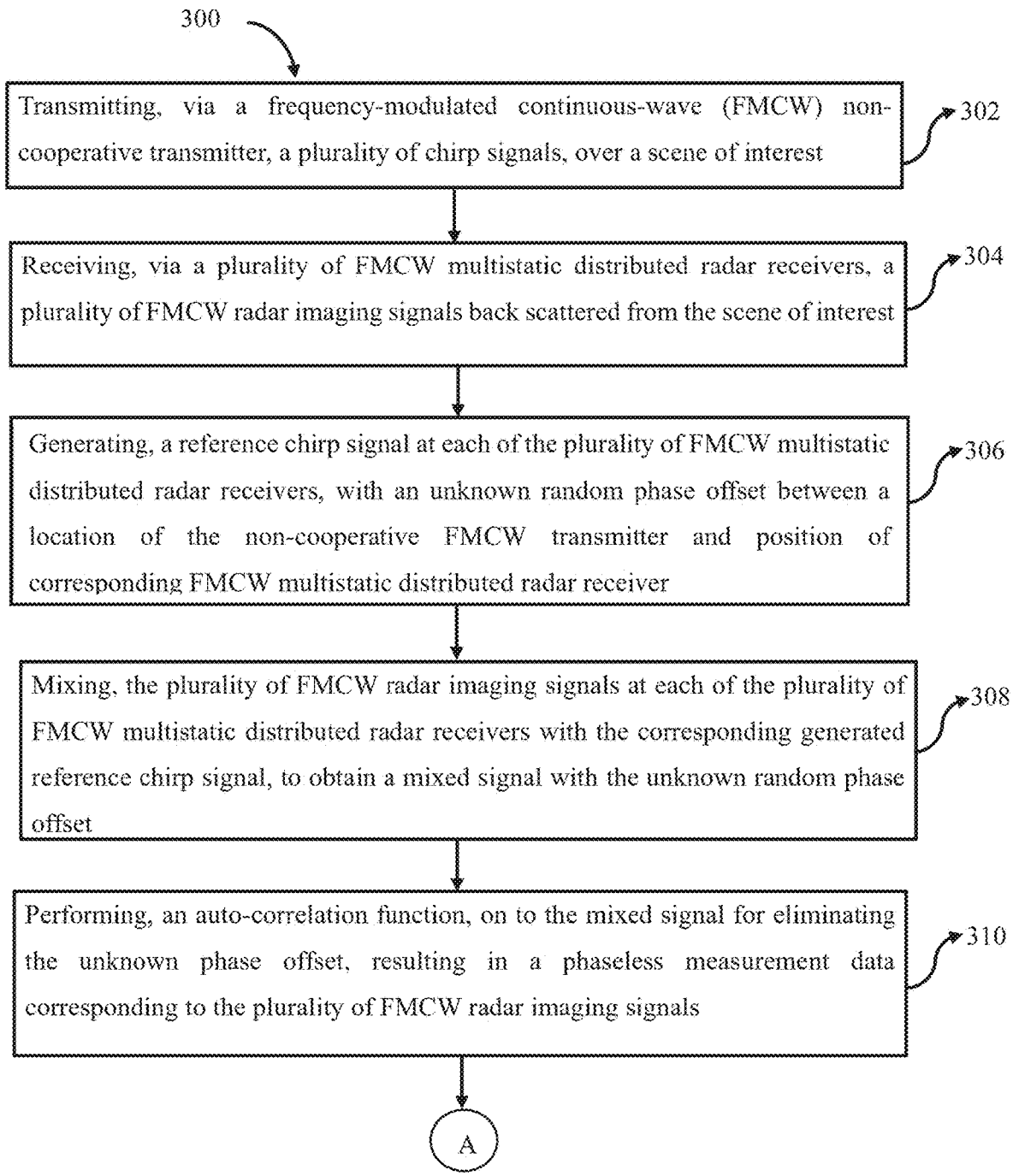
FIGS. 3A and 3B are flow diagrams illustrating a method for the PFMR imaging using the system of FIG. 1 and FIG. 2C, in accordance with some embodiments of the present disclosure.
Figure 3B:
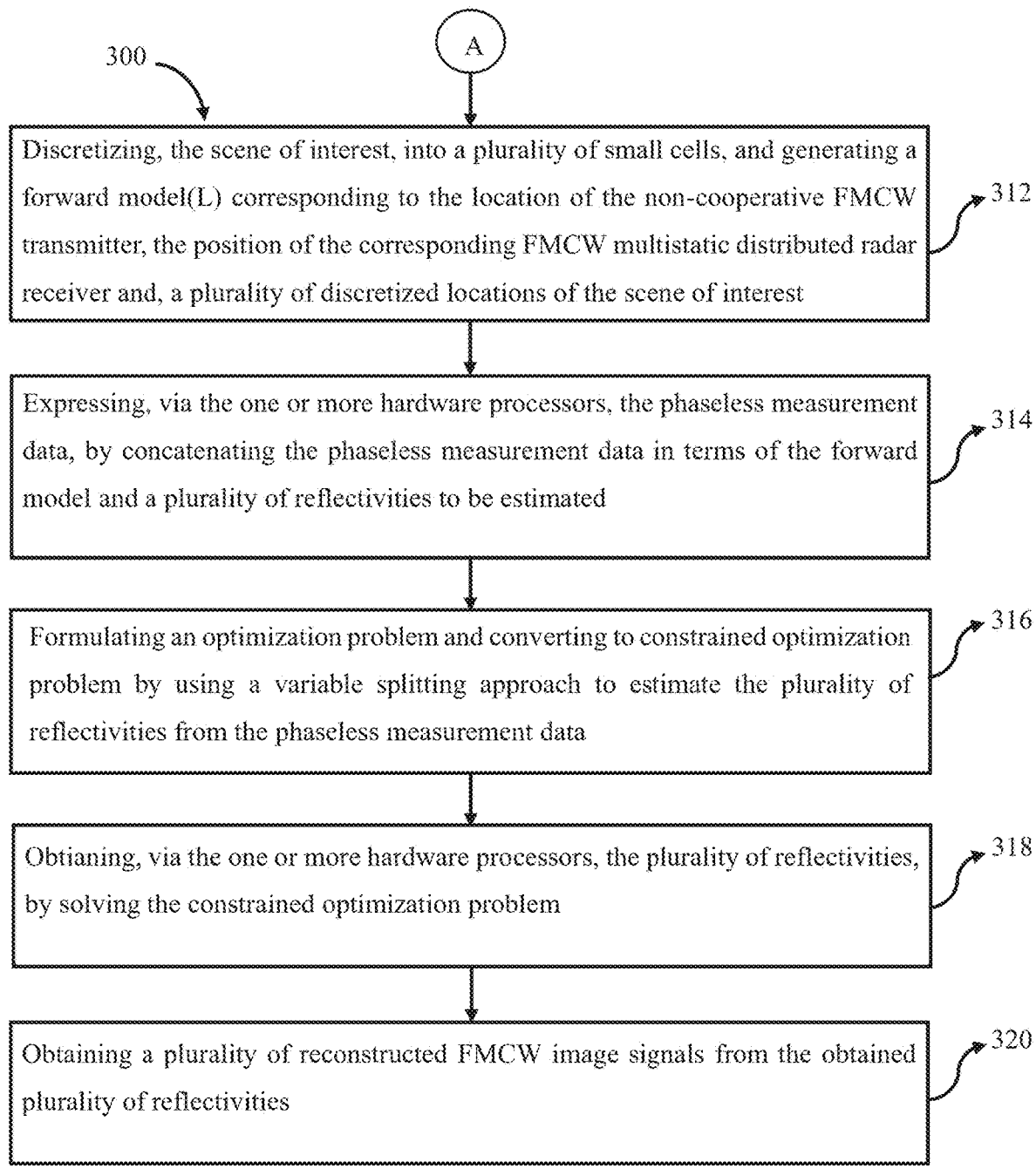

In an embodiment, the system 100 comprises one or more data storage devices or the memory 102 operatively coupled to the processor(s) 104 and is configured to store instructions for execution of steps of the method (300) depicted in FIG. 3 by the processor(s) or one or more hardware processors 104. The steps of the method of the present disclosure will now be explained with reference to the components or blocks of the system 100 as depicted in FIG. 1, architecture diagrams depicted in FIGS. 2A, 2B and 2C and, the steps of flow diagram as depicted in FIGS. 3A and 3B. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

FIGS. 2A and 2B depict architecture diagrams of a classical multistatic Radar imaging, a passive multistatic Radar imaging.

FIG. 2C depicts the PFMR imaging implemented by the system 100 of FIG. 1, according to some embodiments of the present disclosure. The classical multistatic Radar imaging depicted in FIG. 2A works on a principle of a time of arrival (TOA) and a time difference of arrival (TDOA) by cross-correlating between the direct LoS signal and a reflected signal. This method is suitable if the multistatic Radar transmitter is fully co-operative. Further the passive multistatic Radar imaging depicted in FIG. 2B, the multistatic Radar transmitter is a non-cooperative transmitter, which does not require the direct LoS signal. But since the plurality of multistatic distributed Radar receivers are synchronized, localization can be made by cross-correlating among the plurality of multistatic distributed Radar receivers. The plurality of multistatic distributed Radar receivers, are represented as Receiver 1 and Receiver 2 in FIG. 2B, according to some embodiments of the present disclosure. Hence in the classical multistatic Radar imaging and the passive multistatic Radar imaging, the method requires the direct LoS signal to be transmitted and/or the time synchronization among the plurality of multistatic distributed Radar receivers respectively. The PFMR imaging depicted in FIG. 2C disclosed herein relaxes the requirement of the direct LoS signal and only requires the plurality of parameters of the FMCW signal such as the chirp signal rate and the carrier frequency and, the period of chirp to be known. Further, it also removes condition of the time synchronization among the plurality of FMCW multistatic distributed Radar receivers and hence it overcomes the stringent requirements of the classical multistatic Radar imaging and the passive multistatic Radar imaging as depicted in FIG. 2A, FIG. 2B respectively.

FIGS. 3A and 3B with reference to FIG. 1 and FIG. 2C are flow diagrams illustrating a method 300 for the PFMR imaging using the system 100 of FIG. 1, in accordance with some embodiments of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, FIG. 2C and the flow diagram illustrated in FIG. 3A and FIG. 3B.

Referring to steps of FIG. 3A, at step 302 of method 300, the one or more hardware processors 104 transmit, via a FMCW non-cooperative transmitter, the plurality of chirp signals (also known as the FMCW signals)), over the scene of interest. s(t) denotes the actual plurality of chirp signals transmitted which can be expressed as:

$$s(t) = e^{i(\omega_0 t + \alpha t^2)} \quad (1)$$

where $\omega_0$ denotes the carrier frequency; t is a time index; the chirp signal rate $\alpha = B/T$; B denotes bandwidth of the chirp and T denotes the period of chirp respectively; the chirp signal rate, the carrier frequency and, the period of chirp are the plurality of parameters corresponding to the plurality of chirp signals, wherein the plurality of parameters are known to the plurality of FMCW multistatic distributed Radar receivers.

At step 304 of the present disclosure, the method receives, via the plurality of FMCW multistatic distributed Radar receivers controlled by the one or more hardware processors (104), the plurality of FMCW Radar imaging signals back scattered from the scene of interest. The plurality of FMCW Radar imaging signals are the reflected signals from a plurality of reflecting points over the scene of interest. The plurality of FMCW multistatic distributed Radar receivers are asynchronous distributed receivers, and the direct LoS signal is absent between the FMCW non-cooperative transmitter and the plurality of FMCW multistatic distributed Radar receivers. A plurality of parameters comprises the chirp signal rate, the carrier frequency and, the period of chirp, are corresponding to the plurality of chirp signals, wherein the plurality of parameters, are known to the plurality of FMCW multistatic distributed Radar receivers. The FMCW Radar imaging signal among the plurality of FMCW Radar imaging signals at the FMCW multistatic distributed Radar receiver k is expressed as:

$$r_k(t) = \int \rho(x) s\left(t - \frac{R_k(x)}{c}\right) dx + \eta_k(t), \text{ where } k = 1, 2 \ldots K \quad (2)$$

Where $\rho(x)$ is a reflectivity of illumination region of the scene of interest; K is the plurality of FMCW multistatic distributed Radar receivers and $R_k(x) = |y-x| + |x-\gamma_k|$ is a two-way path length from the FMCW non-cooperative transmitter to the plurality of FMCW multistatic distributed Radar receivers;
  x denotes the illumination region of the scene of interest;
  y denotes a location of the transmitter;
  $\gamma_k$ is the position of the $k^{th}$ FMCW multistatic distributed Radar receiver; and
  $\eta_k$ denotes a noise and c is a speed of light.

At step 306, the one or more hardware processors 104 generate, a reference chirp signal at each of the plurality of FMCW multistatic distributed Radar receivers, with the unknown random phase offset ($\phi_k$) between the location of the non-cooperative FMCW transmitter and position of corresponding FMCW mutlitstatic distributed Radar receiver. The generated reference chirp signal is different for each of the plurality of FMCW multistatic distributed Radar receivers. The unknown random phase offset of the reference chirp signal at each of the plurality of FMCW multistatic distributed Radar receiver, appears because of the absence of the direct LoS signal and the asynchronous distributed receivers. The reference chirp signal with the unknown random phase offset between the location of the non-coperative FMCW transmitter and the position of the $k^{th}$ FMCW multistatic distributed Radar receiver is expressed as:

$$\widehat{s_k}(t) = e^{i(\omega_0(t-\phi_k) + \alpha(t-\phi_k)^2)} \quad (3)$$

Upon generation of the reference chirp signal at each of the plurality of FMCW multistatic distributed Radar receivers, at step 308, the one or more hardware processors 104, perform mixing, the plurality of FMCW Radar imaging signals at each of the plurality of FMCW multistatic distributed Radar receivers with the corresponding generated reference chirp signal, to obtain the mixed signal with the unknown random phase offset. The mixed signal is expressed as:

$$\widehat{r_k}(t) = \int \rho(x) e^{i\left(\left(\phi_k - \frac{R_k(x)}{c}\right)(\omega_0 + 2\alpha t) - \alpha\phi_k^2\right)} dx \quad (4)$$

where $\widehat{r_k}(t)$ is a intensity measurement of the mixed signal, in the presence of the unknown random phase offset.

At step 310, the one or more hardware processors 104 perform, an auto-correlation function, on to the mixed signal for eliminating the unknown random phase offset, resulting in a phaseless measurement data corresponding to the plurality of FMCW Radar imaging signals. The phaseless measurement data corresponding to the plurality of FMCW Radar imaging signals is expressed as:

$$d_k(t) = \widehat{r_k}(t)\widehat{r_k}^*(t) = \int\int \rho(x)\rho(\tilde{x}) e^{i(R_k(x) - \tilde{R}_k(\tilde{x}))(\omega_0 + 2\alpha t)/c} dx d\tilde{x} \quad (5)$$

the above integral can be split and expressed as:

$$d_k(t) = \int \rho(x) e^{-1(\omega_0 + 2\alpha t)(|y-x| + |x-\gamma_k|)/c} dx \times \int \rho(\tilde{x}) e^{i(\omega_0 + 2\alpha t)}$$
$$(|y-\tilde{x}| + |\tilde{x}-\gamma^{(k)}|)/c d\tilde{x} \quad (6)$$

Referring to steps of FIG. 3B, at step 312 of the method 300, the one or more hardware processors 104 discretize, the scene of interest, into a plurality of small cells, and generate a forward model(L) corresponding to the location of the non-cooperative FMCW transmitter, the position of the corresponding FMCW multistatic distributed Radar receiver and, a plurality of discretized locations of the scene of interest.

Upon generation of the forward model, at step 314, the one or more hardware processors 104 express, the phaseless measurement data, by concatenating the phaseless measurement data in terms of the forward model and a plurality of reflectivities to be estimated. The phaseless measurement data, in terms of the forward model L and the plurality of reflectivities is expressed as:

$$d = |L\rho|^2 \quad (7)$$

where $d=[d_1, d_2 \ldots d_M]$ and M is total number of measurements; a measurement $d_m$ corresponding to the FMCW multistatic distributed Radar receiver k is expressed as:

$$d_{(m,k)} = |L_{(m,k)}{}^H \rho|^2 \quad (8)$$

where $L_{(m,k)}$ denotes the forward model of $m^{th}$ row of the FMCW multistatic distributed Radar receiver k.

Each element of the forward model $L_{(m,k)}$ is expressed as:

$$[L_{(m,k)}]^n = e^{-i(\omega_0 + 2\alpha t)(|y - x_n| + |x_n - \gamma_k|)/c}|_{(k,t)_m} \quad (9)$$

wherein it can be noticed that $L_{(m,k)}$ doesn't contain the unknown random phase offset, as it is removed from the phaseless measurement data d, wherein in each element of the forward model depends only on location of the FMCW non-cooperative transmitter, wherein if the location of FMCW non-cooperative transmitter is unknown, each element of the forward model is approximated by using far-field and small-scene approximations, $L_{(m,k)}$ approximation, by using far-field and small-scene approximations is expressed as:

$$[L_{(m,k)}]^n \approx e^{-i(\omega_0 + 2\alpha t)(|x_n - \gamma_k| - \hat{y} \cdot x_n)/c} \quad (10)$$

wherein the forward model $L_{(m,k)}$ depends on a look ahead direction ŷ of the FMCW non-cooperative transmitter rather than exact location of the FMCW non-cooperative transmitter.

At step 316, the one or more hardware processors 104 formulate, an optimization problem and convert it to a constrained optimization problem by using a variable splitting approach, to estimate the plurality of reflectivities (ρ) from the phaseless measurement data. The optimization problem to estimate the plurality of reflectivities, using the phaseless measurement data, with a regularized Wirtinger Flow (rWF) based approach is expressed as:

$$\hat{\rho} = \underset{\rho}{\text{argmin }} D(\rho) + \lambda R(\rho) \quad (11)$$

wherein the optimization problem comprises a data-fitting term D(ρ), the rWF regularization term R(ρ) and, a hyperparameter λ, wherein the data-fitting term is defined as quadratic loss function, the hyper-parameter controls amount of regularization and; $\hat{\rho}$ is an optimal solution of the optimization problem, wherein the regularization term in the optimization problem limits the search space for the optimal ρ, that keeps data-fidelity term D(ρ) error low, the data-fitting term is solved, by defining the quadratic loss function and is expressed as:

$$D(\rho) = \frac{1}{2M} \sum_{m=1}^{M} \left\| L_m^H \rho \rho^H L_m - d_m \right\|_2^2 \quad (12)$$

Further the regularization term helps in reconstruction of a PFMR image signal with fewer measurements. The present disclosure solves the optimization problem, by converting it into the constrained optimization problem, by employing the variable splitting approach. The constrained optimization problem by introducing a proxy variable v is expressed as:

$$\{\hat{\rho}, \hat{v}\} = \underset{\rho, v}{\text{argmin }} D(\rho) + \lambda R(v) \text{ subject to } \rho = v \quad (13)$$

the Augmented Lagrangian corresponding to the constrained optimization problem (equation 13) is given by:

$$L(\rho, v, u) = D(\rho) + \lambda R(v) + u_T(\rho - v) + \frac{\mu}{2} \|\rho - v\|_2^2 \quad (14)$$

where μ is a penalty parameter;

T is a transpose; and u represents a Lagrangian parameter.

The Augmented Lagrangian corresponding to the constrained optimization problem is divided into subproblems comprising a first sub problem and a second sub problem and are iteratively solved to calculate a saddle point of the Augmented Lagrangian, by using an Alternating Direction Multipliers Method (ADMM) iteration. Wherein the first sub problem (equation (15)) and the second sub problem (equation (16)) of the Augmented Lagrangian corresponding to the constrained optimization problem is mathematically represented as:

$$\rho^{(l+1)} = \underset{\rho}{\text{argmin }} D(\rho) + \frac{\mu}{2} \left\| \rho - \tilde{\rho}^{(l)} \right\|_2^2 \quad (15)$$

$$v^{(l+1)} = \underset{v}{\text{argmin }} \frac{2\lambda}{\mu} R(v) + \left\| v - \tilde{v}^{(l)} \right\|_2^2 \quad (16)$$

$$\overline{u}^{(l+1)} = \overline{u}^{(l)} + \left( \rho^{(l+1)} - v^{(l+1)} \right) \quad (17)$$

where $\overline{u}^{(l)} = \frac{1}{\mu} u^{(l)}$;

$\tilde{\rho}^{(l)} = v^{(l)} - \overline{u}^{(l)}$;

$\tilde{v}^{(l)} = \rho^{(l+1)}) + \overline{u}^{(l)}$;

$\overline{u}^{(l+1)}$ is update step for u; and l is the ADMM iteration number.

At step 318, the one or more hardware processors 104 obtain, the plurality of reflectivities, by solving the first subproblem and the second subproblem of the constrained optimization problem. The first sub problem of the Augmented Lagrangian corresponding to the constrained optimization problem is solved using Wirtinger derivatives of the ADMM iterations. The initial estimate for the rWF is very important for its convergence and the initial estimate $\rho_0$ of the rWF is selected by using a spectral method. A leading eigenvector of the positive semi-definite matrix $Y = \sum_{m=1}^{M} d_m L_m L_m^H$ is chosen as the initial estimate for $\rho_0$. Further the update step for ρ is expressed as:

$$\rho^{(j+1)} = \rho^{(j)} - \frac{\tau^{(j+1)}}{\|\rho_0\|^2} \nabla J(\rho^{(j)}) \quad (18)$$

$$\text{where } J(\rho^{(j)}) = D(\rho^{(j)}) + \frac{\mu}{2} \|\rho(j) - \tilde{p}^{(l)}\|_2^2$$

and its derivative is expressed as:

$$\nabla J(\rho^{(j)}) = \frac{1}{M} \sum_{m=1}^{M} \left( L_m^H \rho^{(j)} (\rho^{(j)})^H L_m - d_m \right) L_m L_m^H \rho^{(j)} + \mu(\rho^{(j)} - \tilde{p}^{(l)}) \quad (19)$$

$\tau^{(j)}$ denotes the step size at the jth update.

The second sub problem of the Augmented Lagrangian corresponding to the constrained optimization problem solving using l1-norm prior. The computation of the second subproblem is expressed as:

$$v^{(l+1)} = \underset{v}{\operatorname{argmin}} \frac{2\lambda}{\mu} \|v\|_1 + \|v - \tilde{v}^{(l)}\|_2^2 \quad (20)$$

the closed form solution of second sub problem represented in equation (20) in a single step of soft thresholding and is represented as:

$$v^{(l+1)} = \operatorname{sign}(\tilde{v}^{(l)}) \max\left(0, |\tilde{v}^{(l)}| - \frac{\lambda}{u}\right) \quad (21)$$

Upon obtaining the plurality of reflectivities, at step 320, the one or more hardware processors 104 obtain, a plurality of reconstructed PFMR image signals from the obtained plurality of reflectivities.

Experimental Results

Figure 4:
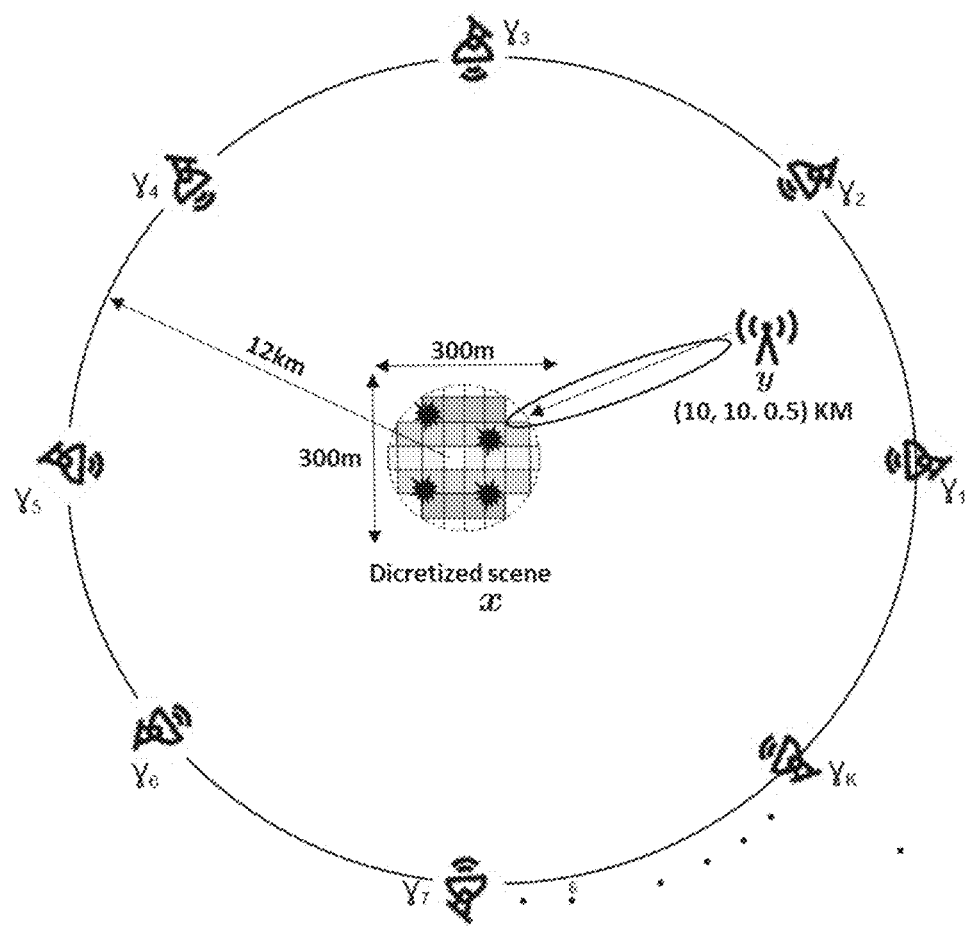
FIG. 4 is depicting a simulation scene of interest on a ground being illuminated by a FMCW non-cooperative transmitter, in accordance with some embodiments of the present disclosure.

The system 100 and method of the present disclosure used simulation of a 300×300 scene of interest (discretized scene) on a ground being illuminated by the FMCW non-cooperative transmitter located at (10, 10, 0.5) km. The plurality of FMCW multistatic distributed Radar receivers are placed equidistantly on a circular path of radius 12 km having an elevation of 6 km as illustrated in FIG. 4, in accordance with some embodiments of the present disclosure. The bandwidth of the chirp is taken as 8 MHz, the carrier frequency is 900 MHz and the scene of interest is discretized into 15×15 pixels. For comparison, it is assumed a signal-to-noise ratio (SNR) of 10 dB.

FIGS. 5A, 5B and 5C shows performance of the PFMR imaging, in accordance with some embodiments of the present disclosure, for 10 targets (scene of interests) and 5 FMCW multistatic distributed Radar receivers. FIG. 5A corresponds to a ground truth of the plurality of reconstructed PFMR image signals. FIG. 5B corresponds to the plurality of reconstructed PFMR image signals when only the look ahead direction ŷ of the FMCW non-cooperative transmitter is known. FIG. 5C corresponds to the to the plurality of reconstructed PFMR image and when the exact location y of the FMCW non-cooperative transmitter is known. The number of FMCW multistatic distributed Radar receivers are 5.

FIGS. 6A, 6B and 6C shows performance of the PFMR imaging, in accordance with some embodiments of the present disclosure, for 15 targets and 5 FMCW multistatic distributed Radar receivers. FIG. 6A corresponds to a ground truth of the plurality of reconstructed PFMR image signals. FIG. 6B corresponds to the plurality of reconstructed PFMR image signals when only the look ahead direction ŷ of the FMCW non-cooperative transmitter is known. FIG. 6C corresponds to the to the plurality of reconstructed PFMR image and when the exact location y of the FMCW non-cooperative transmitter is known. The number of FMCW multistatic distributed Radar receivers are 5. It can be noticed from FIG. 5A through FIG. 5C and FIG. 6A and through FIG. 6C, performance of PFMR imaging is better when the location of the FMCW non-cooperative transmitter is known, since there is no approximation in the forward model.

Figure 7:
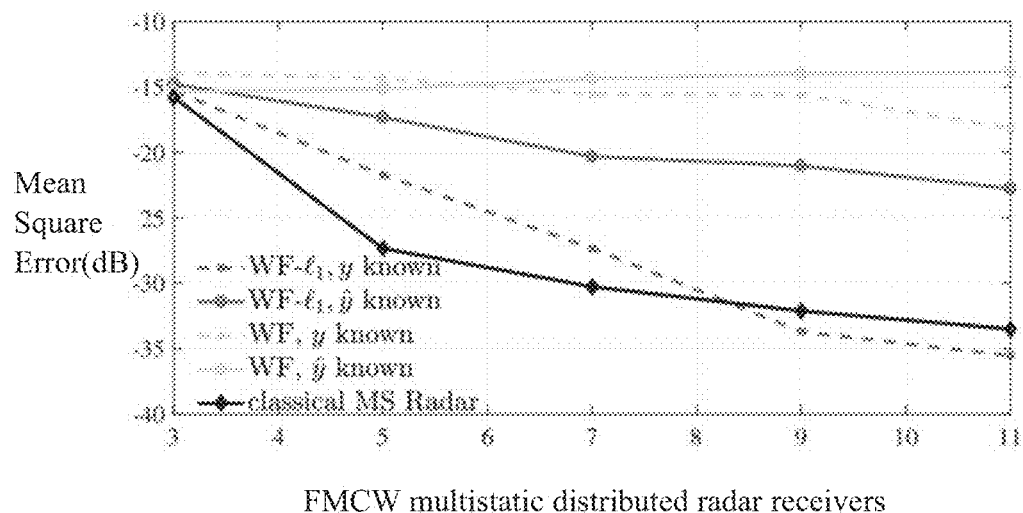
FIG. 7 depicts the performance of the PFMR imaging, for varying number of a plurality of FMCW multistatic distributed Radar receivers, in accordance with some embodiments of the present disclosure.

FIG. 7 shows performance of the PFMR imaging, in accordance with some embodiments of the present disclosure, for varying number of the plurality of FMCW multistatic distributed Radar receivers. Comparison of the rWF with the l1-norm prior (WF-l1) and without l1-norm prior is shown in the FIG. 7. It can be noticed from the graph, performance of the PFMR imaging is better, when the location of the FMCW non-cooperative transmitter is known and furthermore and a significant improvement in the performance can be seen with the use of the l1-norm prior. FIG. 7 also provides the performance plot obtained with classical multistatic Radar. It can be noticed that for the classical multistatic Radar, there is the perfect time synchronization between the plurality of FMCW multistatic distributed Radar receivers and also the availability of the direct LoS signal. It can be observed that the performance of the classical multistatic Radar almost saturates and shows marginal improvement after 7 FMCW multistatic distributed Radar receivers. However, the PFMR requires 9 FMCW multistatic distributed Radar receivers to attain such a performance. These results show that the PFMR imaging requires slightly more FMCW multistatic distributed Radar receivers, but on the other hand, it provides significant systemic advantages as it eliminates the necessity of the time synchronization among the plurality of FMCW multistatic distributed Radar receivers and FMCW non-cooperative transmitter, and also the requirement of the direct LoS. Thus, making the PFMR imaging an attractive choice.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

The embodiments of disclosure present the PFMR imaging which doesn't require the direct Los signal as well as the time synchronization among the plurality of FMCW multistatic distributed Radar receivers and FMCW non-cooperative transmitter. Due to the absence of the direct Los signal and the time synchronization among the plurality of FMCW multistatic distributed Radar receivers and FMCW non-cooperative transmitter, the unknown random phase offset appears in the generated reference chirp signal at each of the plurality of FMCW multistatic distributed Radar receivers. The method and system for the PFMR imaging disclosed herein eliminates the unknown random phase offset, by performing the autocorrelation function on the mixed signal, resulting in a phaseless measurement data corresponding to the plurality of FMCW Radar imaging signals.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
    transmitting, via a frequency-modulated continuous-wave (FMCW) non-cooperative transmitter controlled by one or more hardware processors, a plurality of chirp signals, over a scene of interest;
    receiving, via a plurality of FMCW multistatic distributed Radio Detection And Ranging (Radar) receivers controlled by the one or more hardware processors, a plurality of FMCW Radar imaging signals back scattered from the scene of interest;
    generating, via the one or more hardware processors, a reference chirp signal at each of the plurality of FMCW multistatic distributed Radar receivers, with an unknown random phase offset between a location of the non-cooperative FMCW transmitter and position of corresponding FMCW Radar receiver;
    mixing, via the one or more hardware processors, the plurality of FMCW Radar imaging signals at each of the plurality of FMCW multistatic distributed Radar receivers with the corresponding generated reference chirp signal, to obtain a mixed signal with unknown random phase offset;
    performing, via the one or more hardware processors, an auto-correlation function, on to the mixed signal for eliminating the unknown random phase offset, resulting in a phaseless measurement data corresponding to the plurality of FMCW Radar imaging signals;
    discretizing, via the one or more hardware processors, the scene of interest, into a plurality of small cells, and generate a forward model (L) corresponding to the location of the plurality of FMCW multistatic distributed Radar receivers, the non-cooperative FMCW transmitter and, a plurality of discretized locations of the scene of interest;
    expressing, via the one or more hardware processors, the phaseless measurement data, by concatenating the phaseless measurement data in terms of the forward model and a plurality of reflectivities to be estimated;
    formulating, via the one or more hardware processors, an optimization problem and converting to a constrained optimization problem by using a variable splitting approach, to estimate the plurality of reflectivities from the phaseless measurement data;
    obtaining, via the one or more hardware processors, the plurality of reflectivities ($\rho$), by solving a first subproblem and a second subproblem of the constrained optimization problem; and
    obtaining, via the one or more hardware processors, a plurality of reconstructed phaseless frequency-modulated continuous-wave multistatic Radar (PFMR) image signals from the obtained plurality of reflectivities.

2. The method of claim 1, wherein the plurality of FMCW multistatic distributed Radar receivers are asynchronous distributed receivers, and a Line-of Sight (LoS) signal is absent between the FMCW non-cooperative transmitter and the plurality of FMCW multistatic distributed Radar receivers.

3. The method of claim 1, wherein the unknown random phase offset appears because of the absence of LoS signal and the asynchronous distributed receivers.

4. The method of claim 1, wherein a plurality of parameters comprises a chirp signal rate, a carrier frequency and a period of chirp corresponding to the plurality of chirp signals, and wherein the plurality of parameters are known to the plurality of FMCW multistatic distributed Radar receivers.

5. The method of claim 1, wherein the reference chirp signal is different for each of the plurality of FMCW multistatic distributed Radar receivers.

6. The method of claim 1, wherein in each element of the forward model depends only on the location of the FMCW non-cooperative transmitter, and wherein if the location of the FMCW non-cooperative transmitter is unknown, each element of the forward model is approximated by using far-field and small-scene approximations.

7. A system comprising:
a memory storing instructions;
one or more communication interfaces; and
one or more hardware processors coupled to the memory via the one or more communication interfaces, wherein the one or more hardware processors are configured by the instructions to:
transmit, via a frequency-modulated continuous-wave (FMCW) non-cooperative transmitter, a plurality of chirp signals, over a scene of interest;
receive, via a plurality of FMCW multistatic distributed Radio Detection And Ranging (Radar) receivers, a plurality of FMCW Radar imaging signals back scattered from the scene of interest;
generate a reference chirp signal at each of the plurality of FMCW multistatic distributed Radar receivers, with an unknown random phase offset between a location of the non-cooperative FMCW transmitter and position of corresponding FMCW Radar receiver;
mix the plurality of FMCW Radar imaging signals at each of the plurality of FMCW multistatic distributed Radar receivers with the corresponding generated reference chirp signal, to obtain a mixed signal with unknown random phase offset;
perform an auto-correlation function, on to the mixed signal for eliminating the unknown random phase offset, resulting in a phaseless measurement data corresponding to the plurality of FMCW Radar imaging signals;
discretize the scene of interest, into a plurality of small cells, and generate a forward model(L) corresponding to the location of the plurality of FMCW multistatic distributed Radar receivers, the non-cooperative FMCW transmitter and, a plurality of discretized locations of the scene of interest;
express the phaseless measurement data, by concatenating the phaseless measurement data in terms of the forward model and a plurality of reflectivities to be estimated;
formulate an optimization problem and converting to a constrained optimization problem by using a variable splitting approach, to estimate the plurality of reflectivities from the phaseless measurement data;
obtain the plurality of reflectivities ($\rho$), by solving a first subproblem and a second subproblem of the constrained optimization problem; and obtain a plurality of reconstructed phaseless frequency-modulated continuous-wave multistatic Radar (PFMR) image signals from the obtained plurality of reflectivities.

8. The system of claim 7, wherein the plurality of FMCW multistatic distributed Radar receivers are asynchronous distributed receivers, and a Line-of Sight (LoS) signal is absent between the FMCW non-cooperative transmitter and the plurality of FMCW multistatic distributed Radar receivers.

9. The system of claim 7, wherein the unknown random phase offset appears because of the absence of LoS signal and the asynchronous distributed receivers.

10. The system of claim 7, wherein a plurality of parameters comprises a chirp signal rate, a carrier frequency and a period of chirp are corresponding to the plurality of chirp signals, and wherein the plurality of parameters are known to the plurality of FMCW multistatic distributed Radar receivers.

11. The system of claim 7, wherein the reference chirp signal is different for each of the plurality of FMCW multistatic distributed Radar receivers.

12. The system of claim 7, wherein in each element of the forward model depends only on the location of the FMCW non-cooperative transmitter, wherein if the location of the FMCW non-cooperative transmitter is unknown, each element of the forward model is approximated by using far-field and small-scene approximations.

13. One or more non-transitory machine-readable information storage mediums comprising one or more instructions which when executed by one or more hardware processors cause:
transmitting, via a frequency-modulated continuous-wave (FMCW) non-cooperative transmitter, a plurality of chirp signals, over a scene of interest;
receiving, via a plurality of FMCW multistatic distributed Radio Detection And Ranging (Radar) receivers, a plurality of FMCW Radar imaging signals back scattered from the scene of interest;
generating a reference chirp signal at each of the plurality of FMCW multistatic distributed Radar receivers, with an unknown random phase offset between a location of the non-cooperative FMCW transmitter and position of corresponding FMCW Radar receiver;
mixing the plurality of FMCW Radar imaging signals at each of the plurality of FMCW multistatic distributed Radar receivers with the corresponding generated reference chirp signal, to obtain a mixed signal with unknown random phase offset;
performing an auto-correlation function, on to the mixed signal for eliminating the unknown random phase offset, resulting in a phaseless measurement data corresponding to the plurality of FMCW Radar imaging signals;
discretizing the scene of interest, into a plurality of small cells, and generate a forward model (L) corresponding to the location of the plurality of FMCW multistatic distributed Radar receivers, the non-cooperative FMCW transmitter and, a plurality of discretized locations of the scene of interest;
expressing the phaseless measurement data, by concatenating the phaseless measurement data in terms of the forward model and a plurality of reflectivities to be estimated;
formulating an optimization problem and converting to a constrained optimization problem by using a variable splitting approach, to estimate the plurality of reflectivities from the phaseless measurement data;

obtaining the plurality of reflectivities ($\rho$), by solving a first subproblem and a second subproblem of the constrained optimization problem; and obtaining a plurality of reconstructed phaseless frequency-modulated continuous-wave multistatic Radar (PFMR) image signals from the obtained plurality of reflectivities.

14. The one or more non-transitory machine-readable information storage mediums of claim 13, wherein the plurality of FMCW multistatic distributed Radar receivers are asynchronous distributed receivers, and a Line-of Sight (LoS) signal is absent between the FMCW non-cooperative transmitter and the plurality of FMCW multistatic distributed Radar receivers.

15. The one or more non-transitory machine-readable information storage mediums of claim 13, wherein the unknown random phase offset appears because of the absence of LoS signal and the asynchronous distributed receivers.

16. The one or more non-transitory machine-readable information storage mediums of claim 13, wherein a plurality of parameters comprises a chirp signal rate, a carrier frequency and a period of chirp corresponding to the plurality of chirp signals, and wherein the plurality of parameters are known to the plurality of FMCW multistatic distributed Radar receivers.

17. The one or more non-transitory machine-readable information storage mediums of claim 13, wherein the reference chirp signal is different for each of the plurality of FMCW multistatic distributed Radar receivers.

18. The one or more non-transitory machine-readable information storage mediums of claim 13, wherein in each element of the forward model depends only on the location of the FMCW non-cooperative transmitter, and wherein if the location of the FMCW non-cooperative transmitter is unknown, each element of the forward model is approximated by using far-field and small-scene approximations.

* * * * *